United States Patent [19]

Santasalo

[11] Patent Number: 5,487,814
[45] Date of Patent: Jan. 30, 1996

[54] METHOD FOR DISTILLING AND STERILIZING FEED WATER

[75] Inventor: Lauri Santasalo, Helsinki, Finland

[73] Assignee: Finn-Aqua Santasalo-Sohlberg Oy, Hyryla, Finland

[21] Appl. No.: 128,468

[22] Filed: Sep. 28, 1993

[30] Foreign Application Priority Data

Oct. 1, 1992 [FI] Finland ..................... 924433

[51] Int. Cl.⁶ ..................... B01D 3/06; C02F 1/06
[52] U.S. Cl. ..................... 203/2; 203/10; 203/22; 203/71; 203/88; 202/173; 202/176; 202/177; 202/180; 422/38; 422/308
[58] Field of Search ..................... 203/10, 11, 2, 203/71, 73, 80, DIG. 17, 88; 202/173, 177, 180, 176; 422/38, 308

[56] References Cited

U.S. PATENT DOCUMENTS

| | | | |
|---|---|---|---|
| 3,119,752 | 1/1964 | Checkovich | 202/173 |
| 3,213,001 | 10/1965 | Schmidt | 202/173 |
| 3,219,553 | 11/1965 | Hughes | 202/173 |
| 3,391,062 | 7/1968 | Tidball | 202/173 |
| 3,420,747 | 1/1969 | Williamson | 202/173 |
| 3,442,765 | 5/1969 | Levite | 202/173 |
| 3,607,668 | 9/1971 | Williamson | 202/173 |
| 3,875,017 | 4/1975 | Saari et al. | 202/174 |
| 4,202,736 | 5/1980 | Marcovich et al. | 203/10 |
| 4,733,637 | 3/1988 | Huhta-Koivisto | 122/488 |
| 4,767,502 | 8/1988 | Santasalo et al. | 202/174 |
| 4,917,771 | 4/1990 | Santasalo . | |
| 4,942,847 | 7/1990 | Santasalo . | |

FOREIGN PATENT DOCUMENTS

| | | |
|---|---|---|
| 394182 | 8/1989 | Austria . |
| 73063 | 4/1987 | Finland . |
| 409259 | 2/1925 | Germany . |
| 2727045 | 12/1977 | Germany . |
| 4016116 | 11/1991 | Germany . |
| 8903855 | 5/1991 | Sweden . |
| 1353444 | 5/1974 | United Kingdom . |
| 1462746 | 1/1977 | United Kingdom . |

OTHER PUBLICATIONS

Patent Abstracts of Japan, No. 57–171481, vol. 7, No. 14, Jan. 20, 1983.
Patent Abstracts of Japan, No. 60–78686 (Patent Application No. 58–188957), May 5, 1985.
"Large Scale Production of Sterile, Distilled Water For Hospital Dialysis", S. G. Dawds, Acta Med. Scand. 1973, 193(4), pp. 387–392.

*Primary Examiner*—Wilbur Bascomb, Jr.
*Attorney, Agent, or Firm*—Steinberg, Raskin & Davidson

[57] ABSTRACT

The invention relates to a method and a device for ensuring the sterility of distillate in a multi-stage distilling machine. All feed water of the multi-stage distilling machine flows through a first column operating at the highest temperature so that the temperature of the feed water is equal to or greater than about 121° C., about 131° C., and about 141° C., respectively, and the delay time after the feed water is removed from the first column and before its entry into the first column is at least about 8 minutes, about 0.8 minutes, 0.08 minutes, respectively. The delay produces the result that the distillate of every column of the multi-stage distilling machine is sterile, including that of the last column operating at the lowest temperature. The feed water flows through a first flow line from a second column to the first column, from the first column through a second flow line to a heat exchanger and returns from the heat exchanger through a third flow line to the first column.

18 Claims, 1 Drawing Sheet

METHOD FOR DISTILLING AND STERILIZING FEED WATER

BACKGROUND OF THE INVENTION

The present invention relates to a method of ensuring the sterility of distillate in a multi-stage distilling machine.

The present invention also relates to a device for ensuring the sterility of distillate in a multi-stage distilling machine which comprises numerous columns operating at different operating temperatures. The operating temperatures are stepwise, i.e., incremental. The distilling machine also includes a flow line for feed water and a supply line for steam.

A multi-stage distilling machine typically comprises several columns, usually four, five or six columns. With respect to the prior art, reference is made to Finnish Patent No. 47,083, corresponding to U.S. Pat. No. 3,875,017, which describes a multi-stage distilling machine. A stepwise lower distillation temperature prevails in the different columns of the distilling machine of this patent, for instance, so that the operating temperature in the first column is about 143° C., in the third column about 125° C., in the fourth column about 120° C., in the fifth column about 110° C. and in the sixth or the last column about 100° C. Thus, there is a stepwise decrease from the first column to the last column.

The U.S. standard GMP (Good Manufacturing Practice) defines the minimum action time ($F_o$) as about 8 minutes for moist-heat sterilization at a temperature of about 121° C. Since the Z-value in moist-heat sterilization is about 10° C., $F_o$ would be about 0.8 minutes at a temperature of about 131° C. and, in a corresponding manner, 0.08 minutes at a temperature of about 141° C. The above-mentioned numerical values indicate that the water to be distilled must be maintained at these temperatures for the minimum times in order to be certain that the distillate is definitely sterile.

In the first and the second columns in a multi-stage distilling apparatus, distillation generally takes place at temperatures and during certain times of action that ensure the sterility of distillate. In the last or penultimate columns, in which the operating temperature is only about 100° C. or about 105° C., there is no certain guarantee of the fact that the distillate would be sterile.

OBJECTS AND SUMMARY OF THE INVENTION

An object of the present invention is to ensure that a distillate in a multi-stage distilling machine will be sterile. More particularly, it is an object of the present invention to provide a method and a device in a multi-stage distilling machine which assure in a simple and reliable manner that the distillate of every column is absolutely sterile.

It is another object of the present invention to provide a new and improved multi-stage distilling machine in which the delay time of the feed water at a specific temperature can be regulated to remove harmful objects therein.

Briefly, in the method in accordance with the present invention, all the feed water of a multi-stage distilling machine is directed through the first column operating at the highest temperature so that the temperature of the feed water is at least about 121° C., about 131° C., and about 141° C., respectively, and the delay time thereof is at least about 8 minutes, about 0.8 minutes and about 0.08 minutes, respectively, so that the distillate of every column of the multi-stage distilling machine, including that of the last column operating at the lowest temperature, is sterile. Thus, if the temperature of the feed water in the second flow line is at least about 131° C., the delay time of the feed water in the heat exchanger is at least about 0.8 minutes.

Thus, in the method, a first distillation column operates at a specific temperature. Feed water to be sterilized is passed through the first column but does not mix with the steam in the column, i.e., there is no contact between the feed water and the steam at this stage as the feed water remains in a flow line. The feed water is then removed from the first column after it has reached a temperature equal to or greater than the operating temperature of the first column. After a delay time during which the feed water is sterilized and sterile feed water is formed, the sterile feed water is then brought into physical contact with the steam in a space in the first column in which the steam has been fed. The delay time is determined as a function of the operating temperature of the first column.

In a preferred embodiment, all of the feed water enters the distilling machine through the first column which generally has the highest temperature of all the distillation columns in the distilling machine. Steam is passed through a first branch line to a space in the first column in which heat is exchanged between the steam and the feed water. Steam is also passed through a second branch line to the heat exchanger. The temperature of the feed water can be measured and regulated in the second flow line to thereby cause the delay time of the feed water in the heat exchanger depending on the measured temperature. The feed water is usually vaporized after passing through the heat exchanger and before being passed into the first column.

In the device according to the present invention, a heat exchanger is placed between the column operating at the highest temperature and the succeeding column operating at the second highest temperature. All the feed water of the distilling machine is directed to flow through the heat exchanger so that the temperature of the feed water is at least about 121° C., about 131° C., and about 141° C., respectively, and the delay time therein is at least about 8 minutes, about 0.8 minutes, and about 0.08 minutes, respectively.

It is a particular feature of the present invention that it is possible to arrange a sufficiently high temperature (usually about 140° C.) and a sufficiently long delay time (delay time (t) is about 5 seconds at a temperature of about 141° C.) in the first column for all the feed water of the multi-stage distilling machine. As a result of this arrangement, it can be reliably assured that the distillate of each column of the multi-stage distilling machine, i.e. including that of the last column operating at the lowest temperature, is sterile.

The device of the present invention preferably includes several distillation columns operating at different operating temperatures, a flow line for passing feed water into the distillation machine through the columns such that the feed water upon removal from the columns reaches at least the operating temperature therein. A heat exchanger is arranged between a first column and a second column so that the flow line carries all of the feed water through the first column, but not into contact with steam in the first column, and into the heat exchanger. The feed water remains in the heat exchanger for a delay time during which the feed water is sterilized and a sterile distillate is formed. The columns have a stepwise decreasing operating temperature in a direction of distillation.

BRIEF DESCRIPTION OF THE DRAWINGS

The following drawings are illustrative of embodiments of the invention and are not meant to limit the scope of the invention as encompassed by the claims.

DETAILED DESCRIPTION OF THE INVENTION

Figure 1:
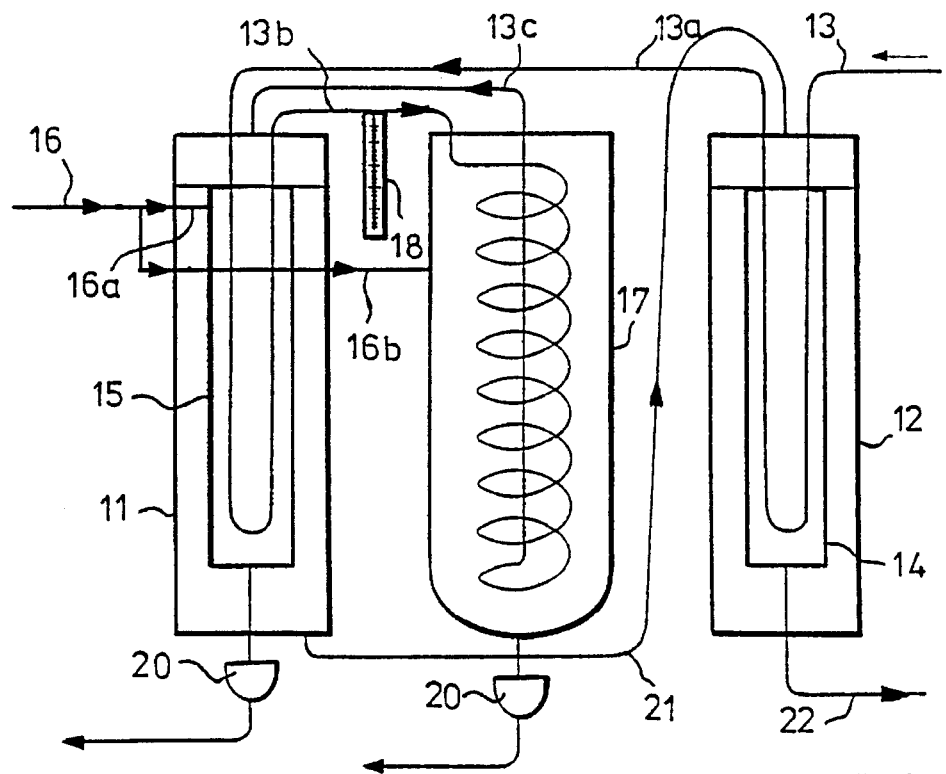
FIG. 1 is a schematic side view of a first and a second column of a multi-stage distilling machine in accordance with the method and device of the present invention.
Figure 2:
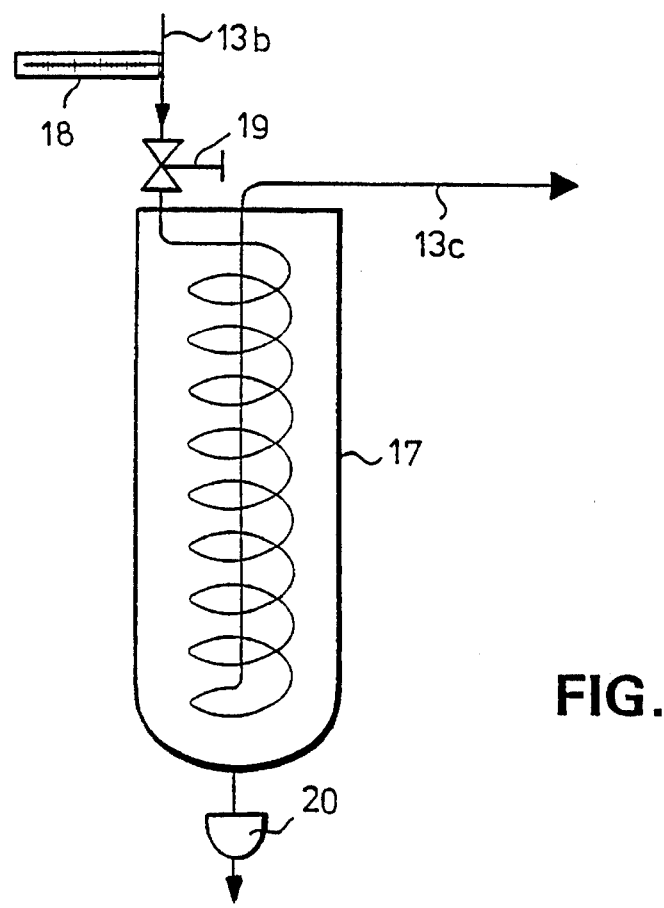
FIG. 2 is a schematic side view of an advantageous embodiment of a heat exchanger used in the method and device of the present invention.

In the embodiment shown in FIGS. 1 and 2, the first column of a multi-stage distilling machine is denoted with reference numeral 11 and the second column is denoted with reference numeral 12. Feed water flows through a flow line 13 to the second column 12. A heat exchanger of the second column 12 is denoted with reference numeral 14 and an outlet line of distillate is denoted with reference numeral 22. The feed water flows from the second column 12 through a flow line 13a to the first column 11. A heat exchanger in the first column is denoted with reference numeral 15. Upon contact between feed water in its vapor phase and heat exchangers 14, 15, the vaporized feed water condenses in the columns 12, 11 respectively. Steam is fed into the first column 11 through a supply line 16. The temperature of the supply steam may be, e.g., about 143° C., when the pressure is about 3 bar.

In accordance with the present invention, the feed water is caused to remain at the operating temperature of the first column 11 for a sufficiently long delay time, so that it can be assured that the water is reliably sterilized. In the embodiment shown in FIGS. 1 and 2 this has been accomplished by arranging a separate heat exchanger 17 between the first column 11 and the second column 12. Heat exchanger 17 may be a container, a tube or a nested tubular construction. The steam flows from the steam supply line 16 through a first branch line 16a to a space in the first column 11 and through a second branch line 16b to the separate heat exchanger 17. The feed water (from the second column 12 via line 13a) flows from the first column 11 through a line 13b to the heat exchanger 17. A thermometer 18 and a flow regulator 19 are arranged in the flow line 13b. When the thermometer 18 detects the temperature of the feed water in the flow line 13b to be at a desired temperature, e.g., about 131° C., the flow regulator 19 operates to provide regulation of the flow of the feed water through line 13b so that the feed water stays in the heat exchanger 17 for the required delay time, i.e. about 0.8 minutes (about 48 seconds).

In the embodiment shown in FIGS. 1 and 2, the feed water is kept in the heat exchanger 17 by arranging the flow line 13b in the form of a helical coil in the heat exchanger 17. The feed water is discharged from the heat exchanger 17 through a flow line 13c to the first column 11 in order to be vaporized therein, e.g., by flashing caused by the release of heated feed water from line 13c into the first column 11. This same process is repeated as the liquid distillate is passed to each column and partially vaporizes therein.

Condensate removers are arranged in the first column 11 and in the heat exchanger 17 and are denoted with reference numeral 20. The feed water sterilized in the first column 11 flows from the column 11 through a flow line 21 to the second column, etc. In the second column 12, the sterilized feed water from the first column 11 partially vaporizes upon entry into the second column 12 and then, sterilized feed water condensed from contact with the heat exchanger 14, is withdrawn through the outline line of distillate 22.

In the present invention, all of the feed water flows through lines 13, 13a, 13b, 13c and through the first column 11 can operate at the highest temperature in the columns of the multi-stage distilling machine. The time which the feed water remains in the first column depends on the temperature of the first column 11. The delay time can be accomplished in a variety of ways, e.g., by regulating the flow of the feed water through line 13b so that the feed water remains in the heat exchanger for a specific delay time. If the temperature of the first column 11 is about 141° C., then the delay time will be 0.08 minutes, or if the temperature of the column 11 is about 131° C., the delay time will be 0.8 minutes, etc. In this manner, impurities in the feed water will "die" to thereby render the feed water sterile in accordance with the invention. The impurities are removed from the feed water in the same manner as they would be removed from tap water which is introduced into an autoclave and kept there at a corresponding temperature for a specific duration.

In a preferred embodiment, the heat exchanger 17 is placed in connection with the column having the highest operating temperature, in this case the first column 11, since it is beneficial if the feed water is kept at the higher temperature as less time is required to remove the impurities. However, the heat exchanger can also be placed in connection with another one of the columns of the multi-stage distilling machine especially if the temperature of that column is sufficiently high to provide for the sterilization function.

The examples provided above are not meant to be exclusive. Many other variations of the present invention would be obvious to those skilled in the art, and are contemplated to be within the scope of the appended claims.

I claim:

1. A method for ensuring the sterility of distillate in a multi-stage distilling apparatus having at least two distillation columns, comprising the steps of:

operating a first distillation column at a specific temperature, passing feed water to be sterilized in a flow line through the first column without releasing the feed water into the first column, heating the feed water in the flow line as it passes through the first column, passing the feed water from the first column to a heat exchanger, retaining the feed water in the heat exchanger for a delay time until the temperature of the feed water contained within the flow line passing through the first column reaches a temperature equal to or greater than the operating temperature of the first column and the feed water is sterilized, the delay time being calculated as a function of the operating temperature of the first column, removing the feed water from the heat exchanger after said delay time, returning the feed water to the first column and releasing the feed water from the flow line into the first column, vaporizing at least a portion of the sterilized feed water in the first column, condensing the vaporized portion of the sterilized feed water in the first column to form a sterile distillate, and removing the sterile distillate from the first column.

2. The method of claim 1, wherein the temperature of the first column is at least about 121° C., about 131° C. or about 141° C., and the delay tire of the feed water is an least about 8 minutes, 0.8 minutes or 0.08 minutes, respectively.

3. The method of claim 1, wherein the operating temperature of the first column is the highest of said at least two distillation columns in the distilling apparatus.

4. The method of claim 1, further comprising the steps of:

passing the feed water from a second distillation column through a first flow line to the first column prior to passing the feed water to be sterilized through the first column, passing the feed water through the first column and then through a second flow line to the heat exchanger, and passing the feed water from the heat exchanger through a third flow line to be released into the first column.

5. The method of claim 4, wherein the temperature of the feed water in the second flow line is at least about 131° C. and the delay time of the feed water in the heat exchanger is at least about 0.8 minutes.

6. The method of claim 4, further comprising the steps of:

passing steam through a first branch line to a space in the first column into contact with the flow line of the feed water passing through the first column such that heat is exchanged between the steam and the feed water, passing the feed water in a separate flow line through the heat exchanger, and passing steam through a second branch line to the heat exchanger into contact with the flow line of the feed water passing through the heat exchanger.

7. The method of claim 4, further comprising measuring the temperature of the feed water in the second flow line.

8. The method of claim 4, further comprising regulating the flow of the feed water through the second flow line to thereby regulate the delay time of the feed water in the heat exchanger.

9. A method for ensuring the sterility of distillate in a multi-stage distilling apparatus having at least two distillation columns, comprising the steps of:

operating a first distillation column at a specific temperature, passing feed water to be sterilized in a first flow line through the first column without releasing the feed water into the first column, heating the feed water in the first flow line as it passes through the first column, passing the feed water from a second distillation column through a second flow line to the first column prior to passing the feed water to be sterilized through the first column in the first flow line, passing steam through a first branch line to a space in the first column into contact with the first flow line of the feed water passing through the first column such that heat is exchanged between the steam and the feed water, passing the feed water from the first column through a third flow line to a heat exchanger after it has reached a temperature equal to or greater than the operating temperature of the first column, passing the feed water in a fourth flow line through the heat exchanger, passing steam through a second branch line to the heat exchanger into contact with the fourth flow line of the feed water passing through the heat exchanger, passing the feed water from the heat exchanger through a fifth flow line into the first column and releasing the feed water from the fifth flow line into the first column after a delay time during which the feed water contained within the first flow line and passing through the first column is sterilized, the delay time being determined as a function of the operating temperature of the first column, keeping the feed water in the heat exchanger for the delay time, vaporizing at least a portion of the sterilized feed water in the first column, condensing the vaporized portion of the sterilized feed water in the first column to form a sterile distillate, and removing the sterile distillate from the first column.

10. The method of claim 9, wherein the temperature of the first column is at least about 121° C., about 131° C. or about 141° C., and the delay time of the feed water is at least about 8 minutes, 0.8 minutes or 0.08 minutes, respectively.

11. The method of claim 9, further comprising the step of operating the first column at the highest operating temperature of said at least two distillation columns in the distilling apparatus.

12. The method of claim 9, further comprising the step of measuring the temperature of the feed water in the second flow line.

13. The method of claim 9, further comprising the step of regulating the flow of the feed water through the third flow line to thereby regulate the delay time of the feed water in the heat exchanger.

14. A method for ensuring the sterility of distillate in a multi-stage distilling apparatus having at least two distillation columns, comprising the steps of:

operating a first distillation column at a specific temperature, passing feed water to be sterilized in a first flow line through the first column without releasing the feed water into the first column, heating the feed water in the first flow line as it passes through the first column, passing the feed water from a second distillation column through a second flow line to the first column prior to passing the feed water to be sterilized through the first column, removing the feed water in the first flow line from the first column through a third flow line to a heat exchanger after it has reached a temperature equal to or greater than the operating temperature of the first column, the temperature of the feed water in the third flow line is at least about 131° C., passing the feed water from the heat exchanger through a fourth flow line into the first column and releasing the feed water from the fourth flow line into the first column after a delay time during which the feed water contained within the first flow line and passing through the first column is sterilized, the delay time being determined as a function of the operating temperature of the first column, keeping the feed water in the heat exchanger for the delay time, the delay time of the feed water in the heat exchanger is at least about 0.8 minutes, vaporizing at least a portion of the sterilized feed water in the first column, condensing the vaporized portion of the sterilized feed water in the first column to form a sterile distillate, and removing the sterile distillate from the first column.

15. The method of claim 14, further comprising the step of passing all of the feed water to be sterilized in the apparatus through the first column.

16. The method of claim 14, further comprising the step of operating the first column at the highest operating temperature of said at least two distillation columns in the distilling apparatus.

17. The method of claim 14, further comprising the step of measuring the temperature of the feed water in the second flow line.

18. The method of claim 14, further comprising the step of regulating the flow of the feed water through the third flow line to thereby regulate the delay time of the feed water in the heat exchanger.

* * * * *